(12) United States Patent
Kimmel et al.

(10) Patent No.: US 8,874,842 B1
(45) Date of Patent: Oct. 28, 2014

(54) SET-ASSOCIATIVE HASH TABLE ORGANIZATION FOR EFFICIENT STORAGE AND RETRIEVAL OF DATA IN A STORAGE SYSTEM

(71) Applicant: NetApp, Inc., Sunnyvale, CA (US)

(72) Inventors: Jeffrey S. Kimmel, Chapel Hill, NC (US); T. Bryon Rakitzis, Seattle, WA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/160,133

(22) Filed: Jan. 21, 2014

Related U.S. Application Data

(63) Continuation of application No. 14/158,608, filed on Jan. 17, 2014.

(51) Int. Cl.
  *G06F 12/00* (2006.01)
  *G06F 3/06* (2006.01)
(52) U.S. Cl.
  CPC ............ *G06F 3/0689* (2013.01); *G06F 3/0655* (2013.01); *G06F 3/0619* (2013.01)
  USPC ............ 711/114; 711/100; 711/103; 711/154
(58) Field of Classification Search
  CPC ........ G06F 3/06; G06F 12/00; G06F 12/0246
  USPC .................. 711/100, 103, 114, 154
  See application file for complete search history.

(56) References Cited

U.S. PATENT DOCUMENTS

| | | | |
|---|---|---|---|
| 5,511,190 A * | 4/1996 | Sharma et al. | 1/1 |
| 5,937,425 A | 8/1999 | Ban | |
| 7,249,150 B1 | 7/2007 | Watanabe et al. | |
| 7,325,059 B2 * | 1/2008 | Barach et al. | 709/225 |
| 7,644,087 B2 * | 1/2010 | Barkai et al. | 707/770 |
| 7,680,837 B2 | 3/2010 | Yamato | |
| 7,996,636 B1 | 8/2011 | Prakash et al. | |
| 8,082,390 B1 | 12/2011 | Fan et al. | |
| 8,099,396 B1 | 1/2012 | Novick et al. | |
| 8,205,065 B2 | 6/2012 | Matze | |
| 8,261,085 B1 * | 9/2012 | Fernandez Gutierrez | 713/181 |
| 8,341,457 B2 | 12/2012 | Spry et al. | |
| 8,417,987 B1 | 4/2013 | Goel et al. | |

(Continued)

OTHER PUBLICATIONS

Cornwall, Michael, "Anatomy of a Solid-state Drive," ACM Queue—Networks, vol. 10, No. 10, Oct. 2012, pp. 1-7.

(Continued)

*Primary Examiner* — Tuan Thai
(74) *Attorney, Agent, or Firm* — Cesari and McKenna, LLP

(57) ABSTRACT

In one embodiment, use of hashing in a file system metadata arrangement reduces an amount of metadata stored in a memory of a node in a cluster and reduces the amount of metadata needed to process an input/output (I/O) request at the node. Illustratively, cuckoo hashing may be modified and applied to construct the file system metadata arrangement. The file system metadata arrangement may be illustratively configured as a key-value extent store embodied as a data structure, e.g., a cuckoo hash table, wherein a value, such as a hash table index, may be configured as an index and applied to the cuckoo hash table to obtain a key, such as an extent key, configured to reference a location of an extent on one or more storage devices, such as solid state drives.

20 Claims, 10 Drawing Sheets

(56) References Cited

U.S. PATENT DOCUMENTS

| | | | |
|---|---|---|---|
| 8,495,417 | B2 | 7/2013 | Jernigan, IV et al. |
| 8,539,008 | B2 | 9/2013 | Faith et al. |
| 8,560,879 | B1 | 10/2013 | Goel |
| 8,595,595 | B1 | 11/2013 | Grcanac et al. |
| 2003/0120869 | A1 | 6/2003 | Lee et al. |
| 2005/0144514 | A1 | 6/2005 | Ulrich et al. |
| 2007/0143359 | A1 | 6/2007 | Uppala |
| 2008/0126695 | A1* | 5/2008 | Berg .................. 711/113 |
| 2010/0042790 | A1 | 2/2010 | Mondal et al. |
| 2010/0088296 | A1 | 4/2010 | Periyagaram et al. |
| 2011/0035548 | A1 | 2/2011 | Kimmel et al. |
| 2011/0213928 | A1 | 9/2011 | Grube et al. |
| 2012/0290788 | A1 | 11/2012 | Klemm et al. |
| 2013/0018854 | A1 | 1/2013 | Condict |
| 2013/0138862 | A1 | 5/2013 | Motwani et al. |
| 2013/0238832 | A1 | 9/2013 | Dronamraju et al. |
| 2013/0238932 | A1 | 9/2013 | Resch |
| 2013/0268497 | A1 | 10/2013 | Baldwin et al. |
| 2013/0346810 | A1 | 12/2013 | Kimmel et al. |

OTHER PUBLICATIONS

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Leventhal, Adam H. "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the $13^{th}$ ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

SET-ASSOCIATIVE HASH TABLE ORGANIZATION FOR EFFICIENT STORAGE AND RETRIEVAL OF DATA IN A STORAGE SYSTEM

RELATED APPLICATION

The present application is a continuation of U.S. patent application Ser. No. 14/158,608, entitled "Set-Associative Hash Table Organization for Efficient Storage and Retrieval of Data in a Storage System", filed on Jan. 17, 2014 by Jeffrey S. Kimmel et al., the contents of which are incorporated by reference herein in their entirety.

BACKGROUND

1. Technical Field

The present disclosure relates to storage systems and, more specifically, to a metadata organization for efficient storage and retrieval of data in a storage system.

2. Background Information

A storage system typically includes one or more storage devices, such as disks embodied as hard disk drives (HDDs) or solid state drives (SSDs), into which information may be entered, and from which information may be obtained, as desired. The storage system may implement a high-level module, such as a file system, to logically organize the information stored on the disks as storage objects, such as files or logical units (LUNs). Each storage container may be implemented as a set of data structures, such as data blocks that store data for the storage containers and metadata blocks that describe the data of the storage containers. For example, the metadata may describe, e.g., identify, storage locations on the disks for the data.

In a traditional file system, large amounts of metadata updates (changes) may be incurred when processing input/output (I/O) requests, such as read or write requests. That is, a relatively large amount of metadata may be written in proportion to an amount of data (to be written) for the associated I/O request(s), i.e., high write amplification. For example, in the case of a write request having write data that changes data (user data) of a LUN, processing of the request at the storage system may require many accesses to the disks to acquire and update one or more indirect blocks (metadata) associated with the changed user data. Updating of the indirect blocks may result in large amounts of metadata changes, thereby causing high write amplification. In the case of a read request, substantial latency may be incurred if access to metadata on disk is required before accessing requested user data on disk. For instance, if an average of two disk accesses per read request is required, the resulting read amplification reduces performance by half. In addition, if the I/O request requires opening of a directory to access file system metadata, many disk accesses may be required, thereby causing high read amplification. By reducing the amount of metadata needed to process the I/O requests and maintaining a substantial amount of that needed metadata in a memory, e.g., RAM, of the storage system, the amount of disk accesses (read and write) may be reduced, thus reducing both read and write amplification.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

The embodiments described herein are directed to the use of hashing in a file system metadata arrangement that reduces an amount of metadata stored in a memory of a node in a cluster and that reduces the amount of metadata needed to process an input/output (I/O) request at the node. Illustratively, the embodiments are directed to cuckoo hashing and, in particular, to a manner in which cuckoo hashing may be modified and applied to construct the file system metadata arrangement. In an embodiment, the file system metadata arrangement may be illustratively configured as a key-value extent store embodied as a data structure, e.g., a cuckoo hash table, wherein a value, such as a hash table index, may be configured as an index and applied to the cuckoo hash table to obtain a key, such as an extent key, configured to reference a location of an extent on one or more storage devices, such as solid state drives (SSDs). Thus, the cuckoo hash table embodies extent metadata that describes the extent and, as such, may be organized to associate a location on SSD with an index, i.e., a value associated with the hash table index identifies the location on SSD. Advantageously, the file system metadata arrangement achieves a high degree of metadata compactness, thus reducing read and write amplification as well as memory requirements.

DESCRIPTION

Storage Cluster

Figure 1:
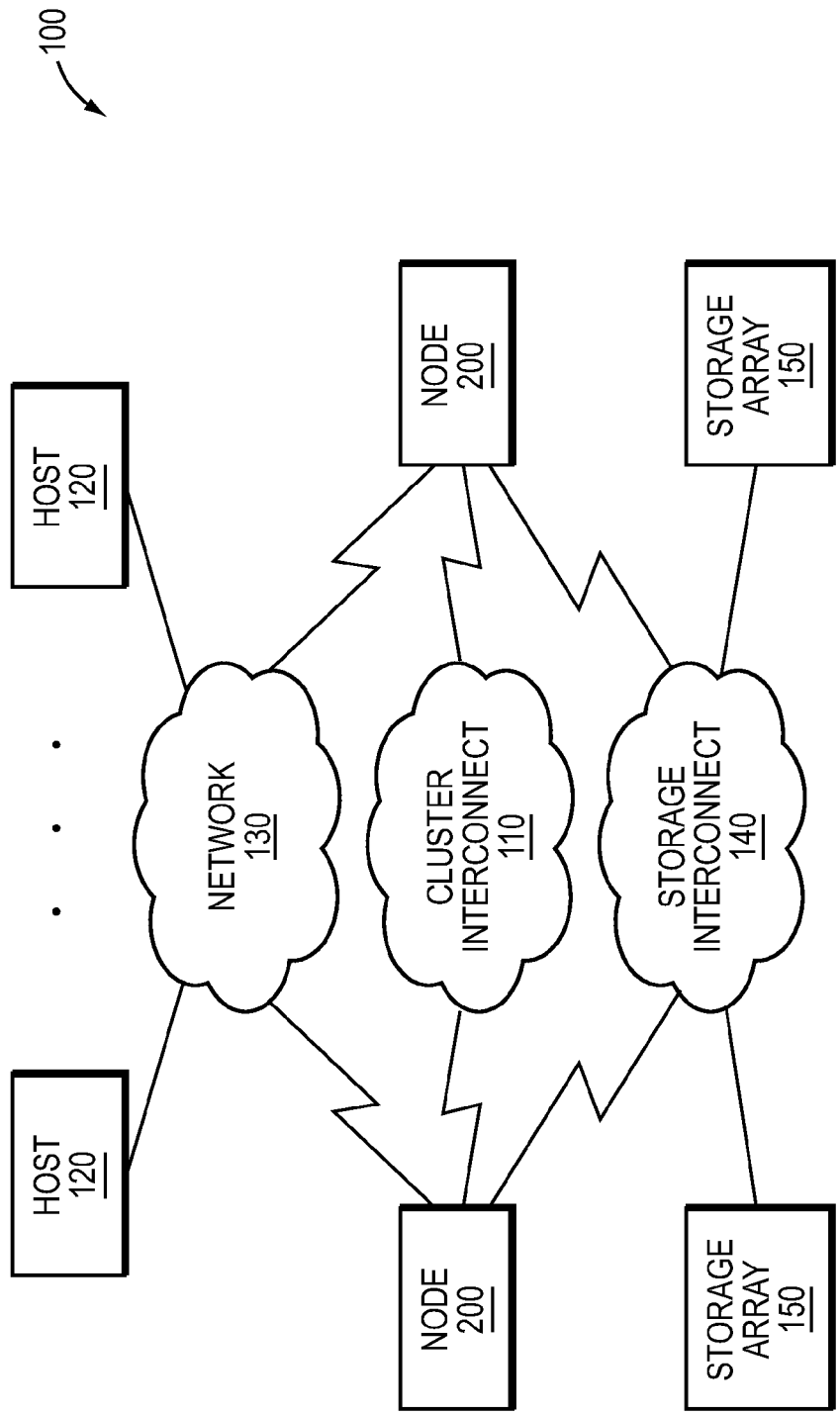
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
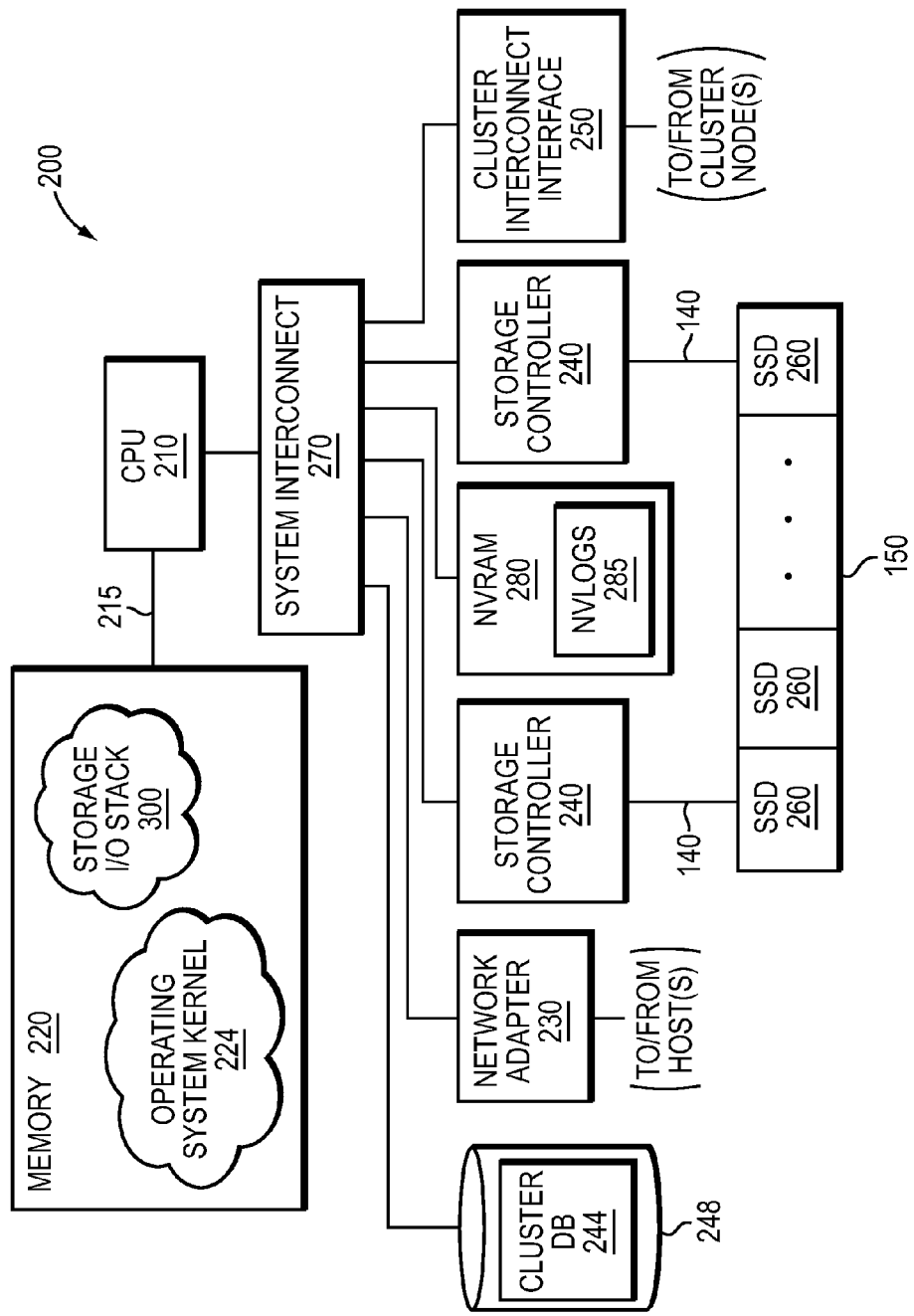
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory, such as storage class memory) that is capable of maintaining data in light of a failure to the node and cluster environment. Illustratively, a portion of the NVRAM 280 may be configured as one or more non-volatile log (NVLogs 285) configured to temporarily record ("log") I/O requests, such as write requests, received from the host 120.

Storage I/O Stack

Figure 3:
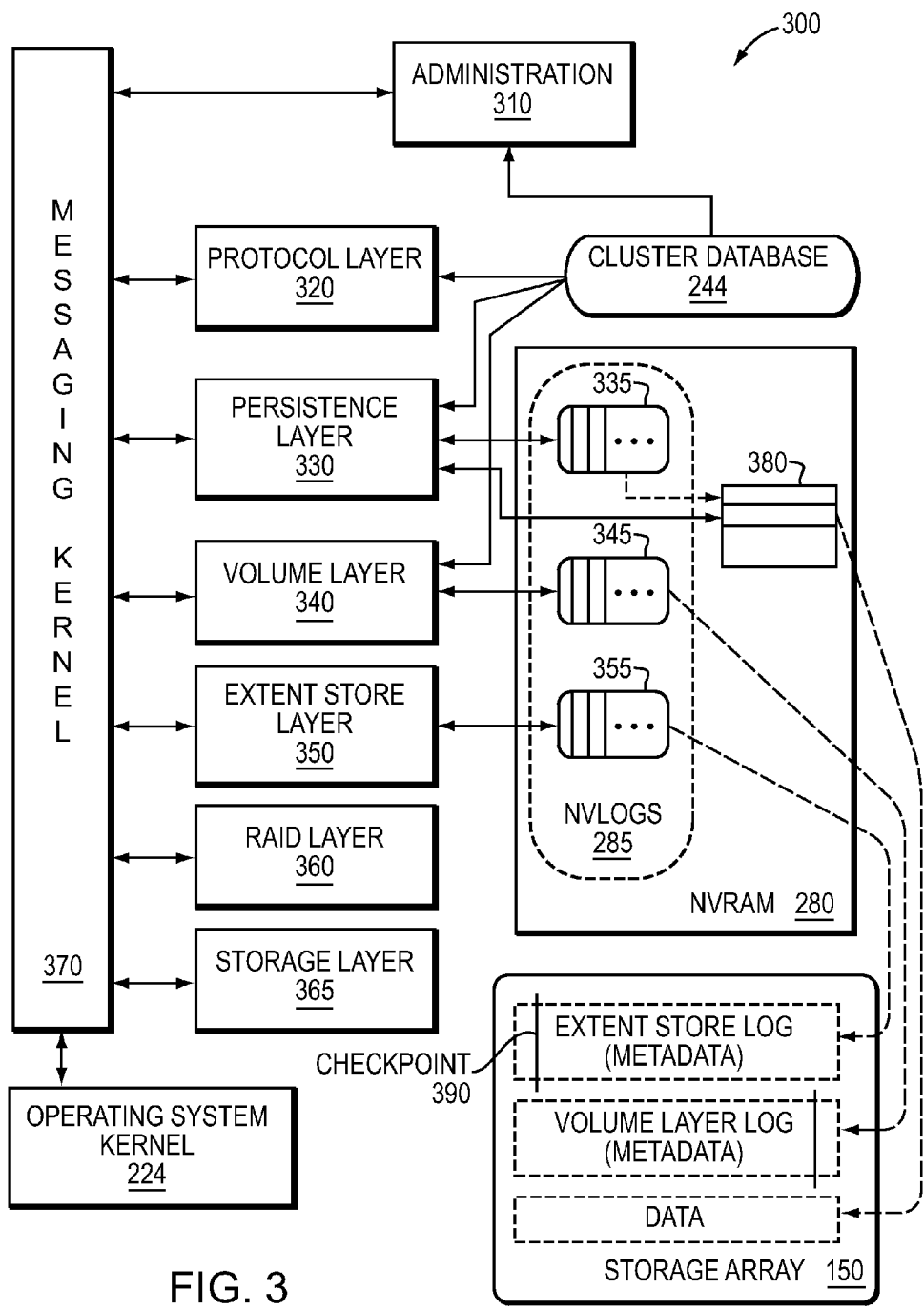
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) storage layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment, only I/O requests that modify the LUN (e.g., write requests) are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. As described further herein, an extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings (less than the total) are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
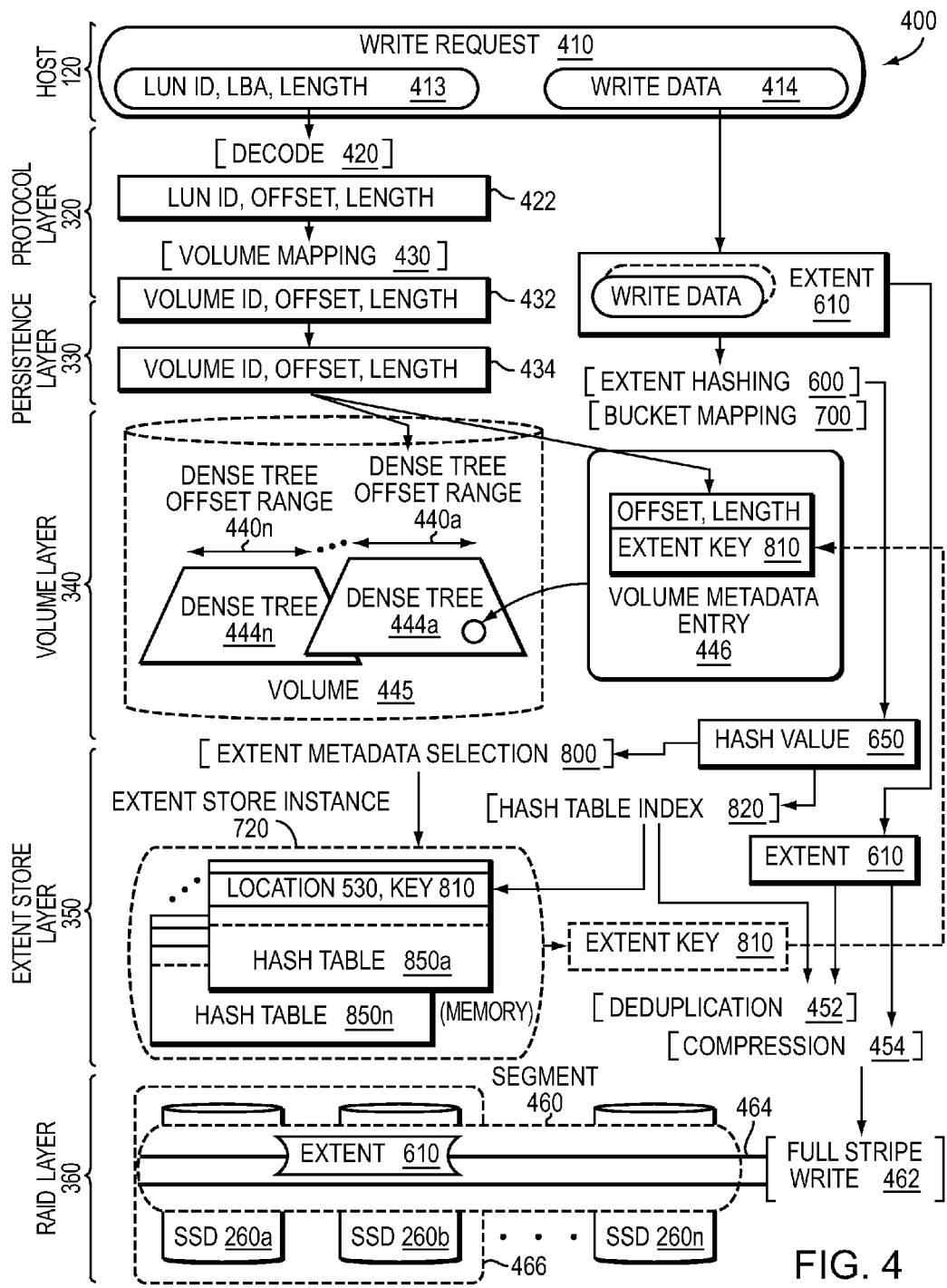
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. As described herein, the persistence layer 330 may aggregate and organize write data 414 from one or more write requests into a new extent 610 and perform a hash computation, i.e., a hash function, on the new extent to generate a hash value 650 in accordance with an extent hashing technique 600.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to anther node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 700 is provided that translates the hash value 650 to an instance 720 of an appropriate extent store layer (i.e., extent store instance 720) that is responsible for storing the new extent 610. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 700 described herein. The persistence layer 330 may then pass the hash value 650 and the new extent 610 to the appropriate volume layer instance and onto the appropriate extent store instance via an extent store put operation. The extent hashing technique 600 may embody an approximately uniform hash function to ensure that any random extent to be written may have an approximately equal chance of falling into any extent store instance 720, i.e., hash buckets are distributed across extent store instances of the cluster 100 based on available resources. As a result, the bucket mapping technique 700 provides load-balancing of write operations (and, by symmetry, read operations) across nodes 200 of the cluster, while also leveling flash wear in the SSDs 260 of the cluster.

In response to the put operation, the extent store instance may process the hash value 650 to perform an extent metadata selection technique 800 that (i) selects an appropriate hash table 850 (e.g., hash table 850a) from a set of hash tables (illustratively in-core) within the extent store instance 720, and (ii) extracts a hash table index 820 from the hash value 650 to index into the selected hash table and lookup a table entry having an extent key 810 identifying a storage location 530 on SSD 260 for the extent. Accordingly, the extent store layer may contain computer executable instructions executed by the CPU 210 to perform operations that implement the extent metadata selection technique 800. If a table entry with a matching key is found, then the SSD location 530 mapped from the extent key 810 is used to retrieve an existing extent (not shown) from SSD. The existing extent is then compared with the new extent 610 to determine whether their data is identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 810 of the existing extent is passed to the appropriate volume layer instance for storage within an entry (denoted as volume metadata entry 446) of a dense tree metadata structure 444 (e.g., dense tree 444a), such that the extent key 810 is associated an offset range 440 (e.g., offset range 440a) of the volume 445.

However, if the data of the existing extent is not identical to the data of the new extent 610, a collision occurs and a deterministic algorithm is invoked to sequentially generate as many new candidate extent keys mapping to the same bucket as needed to either provide de-duplication 452 or to produce an extent key that is not already stored within the extent store instance. Notably, another hash table (e.g. hash table 850n) may be selected by a new candidate extent key in accordance with the extent metadata selection technique 800. In the event that no de-duplication opportunity exists (i.e., the extent is not already stored) the new extent 610 is compressed in accordance with compression technique 454 and passed to the RAID layer 360, which processes the new extent 610 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 610. Illustratively, the identified storage segment is a segment with a large contiguous free space having, e.g., location 530 on SSD 260b for storing the extent 610.

In an embodiment, the RAID layer 360 then writes the stripes 464 across the RAID group 466, illustratively as one or more full write stripes 462. The RAID layer 360 may write a series of stripes 464 of sufficient depth to reduce data relocation that may occur within flash-based SSDs 260 (i.e., flash block management). The extent store instance then (i) loads the SSD location 530 of the new extent 610 into the selected hash table 850n (i.e., as selected by the new candidate extent key), (ii) passes a new extent key (denoted as extent key 810) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer log 345. Accordingly, the I/O (write) request is sufficiently stored on SSD 260 of the cluster.

Read Path

Figure 5:
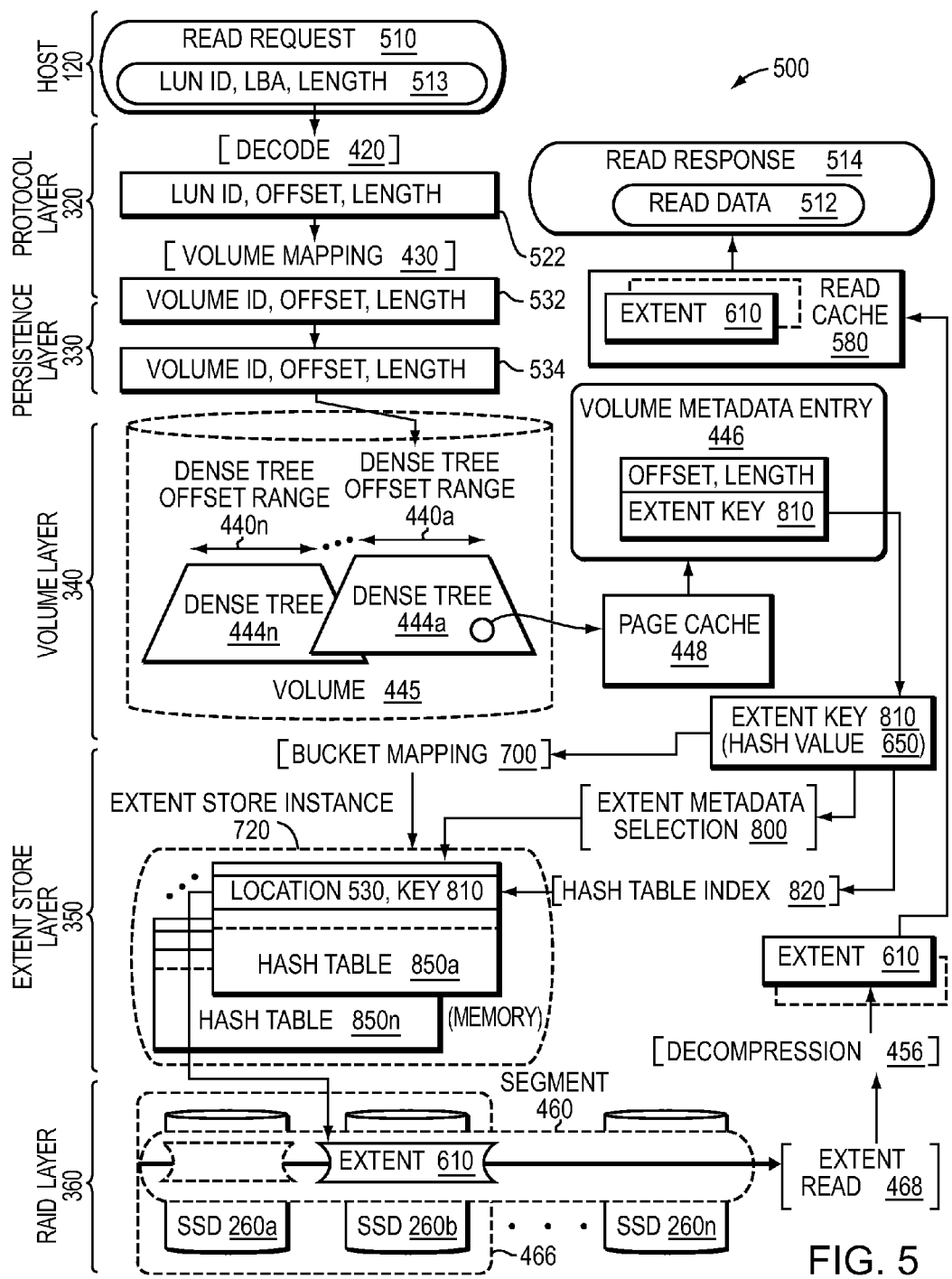
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write-back cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., for RPC, for inter-node communication) or the IPC mechanism (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 810 associated with one or more extents 610 within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 810 for the entire requested read range are found. If no metadata entries exist for the entire or portions of the requested read range, then the missing portion(s) are zero filled.

Once found, each extent key 810 is processed by the volume layer 340 to, e.g., implement the bucket mapping technique 700 that translates the extent key to an appropriate extent store instance 720 responsible for storing the requested extent 610. Note that, in an embodiment, each extent key 810 may be substantially identical to the hash value 650 associated with the extent 610, i.e., the hash value as calculated during the write request for the extent, such that the bucket mapping 700 and extent metadata selection 800 techniques may be used for both write and read path operations. Note also that the extent key 810 may be derived from the hash value 650. The volume layer 340 may then pass the extent key 810 (i.e., the hash value from a previous write request for the extent) to the appropriate extent store instance 720 (via an extent store get operation), which performs an extent key-to-SSD mapping to determine the location on SSD 260 for the extent.

In response to the get operation, the extent store instance may process the extent key 810 (i.e., hash value 650) to perform the extent metadata selection technique 800 that (i) selects an appropriate hash table 850 (e.g., hash table 850a) from a set of hash tables within the extent store instance 720, and (ii) extracts a hash table index 820 from the extent key 810 (i.e., hash value 650) to index into the selected hash table and lookup a table entry having a matching extent key 810 that identifies a storage location 530 on SSD 260 for the extent 610. That is, the SSD location 530 mapped to the extent key 810 may be used to retrieve the existing extent (denoted as extent 610) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although it will be understood to those skilled in the art that decompression can be performed at any layer of the storage I/O stack 300. The extent 610 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Extent Hash Structure

Figure 6:
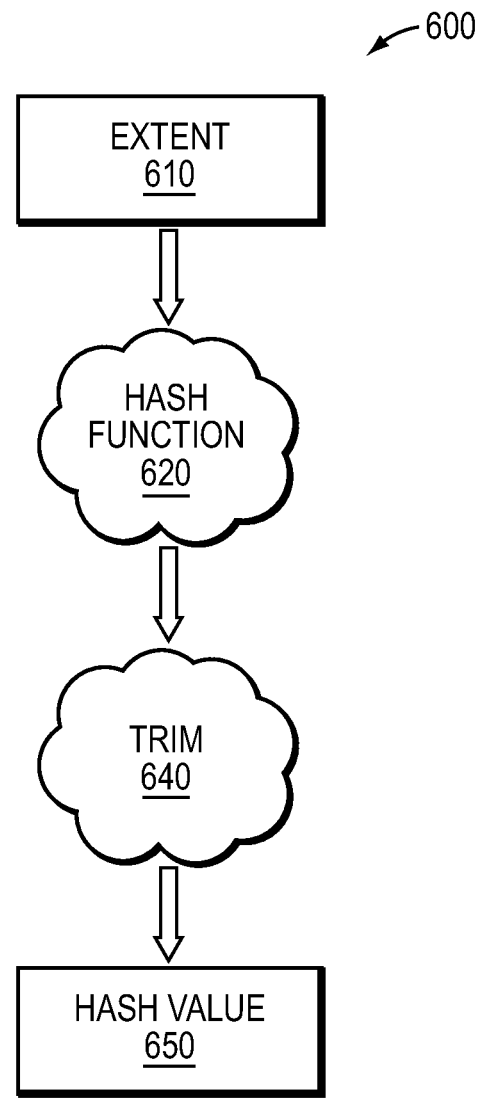
FIG. 6 is a block diagram of an extent hashing technique.

FIG. 6 is a block diagram of the extent hashing technique 600 that may be advantageously used with one or more embodiments described herein. As noted, the persistence layer 330 may organize the write data of one or more write requests into one or more extents 610, each of which is embodied as a variable length block. The length of the extent may vary between 1 byte and 64 KB (or larger) although, e.g., the extent is typically 4 KB or more in length. The extent 610 is illustratively a logically contiguous portion of a LUN (or file) that is stored physically contiguous on SSD 260 within a node of the cluster so that, e.g., it can be read from the SSD in a single read operation. Thus, extents aggregated from multiple I/O requests may include contiguous offset ranges within any LUN. Accordingly, multiple LUNs (and/or files) may share the same extent at different addresses (so long as logically contiguous within each LUN), because the extent generally does not maintain information with respect to its presence in the storage pool of the cluster 100.

In an embodiment, a random technique, such as a hash function 620 (e.g., an approximately uniform hash), may be applied to each extent 610 to generate a hash value 650 that is used to distribute (e.g., using the extent metadata selection technique) the write data (i.e., extent data) and associated metadata substantially evenly among the nodes 200 to enable fine-grain scale out and de-duplication 452 in the cluster 100. The hash computation is performed on the entire extent and may be computed any time before the extent is passed to an extent store instance. Illustratively, the resulting hash value 650 may be used for two generally similar tasks. The first task is to distribute (spread) the extents and associated metadata evenly within each extent store instances. Thus, the hash value 650 is illustratively computed at the persistence layer 330, but may be computed at or before the volume layer 340 because the volume layer needs the hash value to determine the extent store instance of a node that services the extent.

The hash computation is illustratively performed in accordance with a secure hash algorithm, e.g., SHA-3 or Echo 256 cryptographic hash function, to generate a 256-bit hash function result (not shown). Alternatively, hash algorithms, such as SipHash (secure 64-bit) or CityHash (non-crypto 64-bit) may be used. A portion, e.g., the lower 6 bytes (48 bits), of the 256-bit hash function result may be illustratively trimmed, e.g., in accordance with a trim technique 640, to generate a 48-bit hash value 650. It will be apparent to those skilled in the art that the trimmed size of the hash value may be enlarged as the storage capacity of the cluster increases. In an embodiment, the trim technique 640 essentially truncates or severs the 6-byte (48-bit) portion of the hash value 650 from the 32-byte hash function result. The resulting 6 bytes (48 bits) of the hash value 650 are illustratively sufficient to enable the extent store instance to find a representation of the location of the extent 610 on SSD 260 via entries in the hash tables 850. In addition, the hash value 650 illustratively enables its associated metadata, e.g., extent metadata in entries of the hash tables 850, to reside entirely in memory 220. However, a wider hash value (i.e., consuming more memory 220) may be used to improve the chances of performing de-duplication 452 of new extents without having to actually compare the write data of previous extents stored on SSD. The hash value 650 may be used to perform address-like determinations within portions of its hash space in accordance with various techniques, such as bucket mapping 700 and extent metadata selection 800 within the storage I/O stack 300, to select the appropriate hash table 850a for the extent 610.

Figure 7:
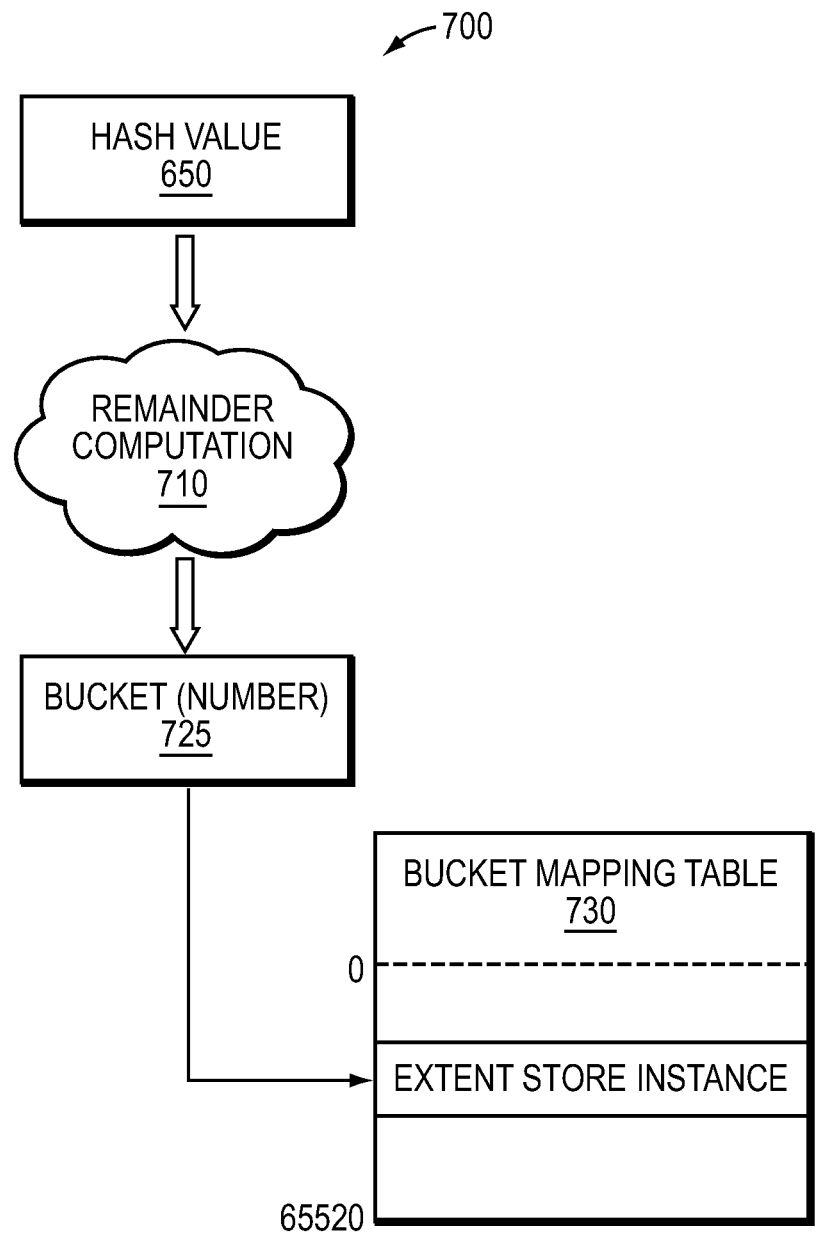
FIG. 7 is a block diagram of a bucket mapping technique.

FIG. 7 is a block diagram of the bucket mapping technique 700 that may be advantageously used with one or more embodiments described herein. As noted, the hash value 650 may be computed at the persistence layer 330 so as to enable efficient distribution of the extents 610 and associated extent metadata evenly throughout the nodes 200 of the cluster. In an embodiment, the mapping technique divides (e.g., substantially evenly) the hash space of the 48-bit hash value 650 (i.e., $2^{48}$) into buckets that, collectively, are representative of the extents and associated extent metadata. A substantially equal number of buckets is then assigned or mapped to each extent store instance of the nodes in the cluster 100 to thereby distribute ownership of the buckets, and thus the extents and extent metadata, substantially evenly, i.e., approximately uniformly, across all the extent store instances 720 of the nodes 200. Notably, the buckets may be alternatively assigned (or reassigned) by weighted distribution according to characteristics of the nodes such as storage capacity and performance.

In an embodiment, the bucket mapping technique maps buckets to extent store instances using a remainder computation 710 based on modulus arithmetic: the hash value divided by (modulo) the number of buckets, e.g., [hash value] mod [number of buckets]. Illustratively, the number of buckets (i.e., divisors) is a prime, e.g., 65521 (the largest prime less than $2^{16}$), although those skilled in the art will recognize that other divisors may be used in accordance with the embodiments described herein. The results of the remainder computation may be organized as a data structure, such as a bucket mapping table 730, having 65521 bucket number entries, each of which maps to (references) an extent store instance. Alternatively, a bucket mapping data structure in the cluster database 244 may be used to associate a bucket (number) 725, e.g. 0-65520, to an extent store instance or node 200 to thereby map the corresponding bucket to that extent store instance or node.

The buckets may be continually mapped to extent store instances and, as new extents 610 are formed, they may be assigned to the buckets. The mappings from bucket numbers to extent store instances of the nodes are essentially arbitrary; a requirement may be that the number of buckets served by each extent store instance is proportional to the storage capacity and processing bandwidth available in each node 200. The buckets 725 may be distributed among the extent store instances to thereby achieve a substantially even and balanced level of capacity and bandwidth utilization across all of the nodes in the cluster 100.

A new extent 610 may be subsequently formed at a node and applied to the hash function 620 to generate a result (as described above), which may be trimmed using technique 640 to generate the hash value 650 to select the extent store instance for storing the new extent 610. The hash value 650 may then be processed by the remainder computation 710 that divides the hash value by the number of buckets, e.g., [hash value] mod [number of buckets], wherein the number of buckets is illustratively a prime, e.g., 65521. The result of the computation generates a bucket number associated with a bucket that functions as an index into a selected entry of the bucket mapping table 730 to identify an extent store instance that serves the new extent associated with the hash value 650. Alternatively, the bucket mapping data structure of the cluster database 244 may be searched using the bucket number as a key to identify an associated value, i.e., an extent store instance or node 200, of a key-value pair. The hash value 650 may thereafter be passed to the extent store instance to enable selection of extent metadata used to identify a location 530 of the extent on SSD 260.

Cuckoo Hashing

The embodiments described herein are directed to the use of hashing in a file system metadata arrangement that reduces an amount of metadata stored in a memory of a node in a cluster and that reduces the amount of metadata needed to process an I/O request at the node. Illustratively, the embodiments are directed to cuckoo hashing and, in particular, to a manner in which cuckoo hashing may be modified and applied to construct the file system metadata arrangement. In an embodiment, the file system metadata arrangement may be illustratively configured as a key-value extent store embodied as a data structure, e.g., a cuckoo hash table, wherein a value, such as a hash table index, may be applied to the cuckoo hash table to obtain a key, such as an extent key, configured to reference a location of an extent on one or more storage devices, such as SSDs. Thus, the cuckoo hash table embodies extent metadata that describes the extent and, as such, may be organized to associate a location on SSD with an index, i.e., a value associated with the hash table index identifies the location on SSD. Advantageously, the file system metadata arrangement achieves a high degree of metadata compactness, thus reducing read and write amplification as well as memory requirements.

In an embodiment, storage and retrieval of key-value pairs employ cuckoo hashing, i.e., the set of cuckoo hash tables, using a portion of the hash value 650 as a hash table index (i.e., indexing into the cuckoo hash table), which is illustratively split in half. Each half of the hash table index may be used as an index into each cuckoo hash table to determine a potential entry for storing the other half of the hash table index in the table. That is, one half of the hash table index may be used as the index into the cuckoo hash table, while the other half may be used as the value stored in the hash table. Alternatively, the other half of the hash table index may be used as the index, while the one half may be used as the stored value. Thus, the same hash table index can be stored in the cuckoo hash table in two different ways, i.e., either in an upper half or lower half of the cuckoo hash table. This allows higher population, i.e., load factor, in the hash table without chaining, e.g., the use of linked lists, by accessing an entry with the one half of the hash table index as the index and, if the entry is occupied, accessing another entry with the other half of the hash table index as the index. Accordingly, cuckoo hashing reduces an amount of metadata (i.e., the hash table index) stored in the memory of the node as a result of a higher load factor. If both entries are occupied, then one of the two entries is chosen and the prior content of the entry may be evicted and re-inserted into the cuckoo table at an alternate location (i.e., alternate entry) using the prior content as an alternate index to the hash table, i.e., not resolving to either of the two entries. The hash table index, i.e., referencing the chosen entry, may then be stored at the alternate location. If the alternate location also is occupied, the prior content of the alternate entry may also be evicted. This eviction process may be repeated until an unoccupied entry is found.

However, as full capacity (i.e., load) of the hash table is approached, a cycle effect may be realized wherein two or more entries chain together through their present and alternate hash table locations to form a complete cycle; if this occurs, no new insertions can occur at any of these locations. To eliminate this problem, the cuckoo hash table embodies a set associative organization such that, for each entry that is indexed by half of the hash table index, there is a plurality of possible slots (i.e., a group of slots associated with the index) into which the other half of the hash table index may be inserted/stored, i.e., all of the slots are associated with the indexing hash table index (i.e., the hash table index used to index the group of slots), but each slot may include a different other half of the hash table index. Generally, a free slot of the plurality of possible slots may be found by linear search of the plurality of slots for the non-indexing half of the hash table index, i.e., if K1 indexes for the entry/slot, a search for K2 is performed. Alternatively, the associative set may be sorted permitting a more efficient search, e.g., a binary search, to be used.

In an embodiment, the cuckoo hash table may be organized with a 32-way set associativity, i.e., the hash table index stored in the cuckoo hash table may be found in any of 32 slots of the hash table indexed at the one half of the hash table index or any of 32 slots indexed by the other half of the hash table index. If an adequately uniform hash function is used, the distribution may be sufficiently balanced such that there may be unoccupied slots for a given hash value. That is, as long as the entire hash table is not full, one of the 64 potential slots for the hash table index is likely to be unoccupied so that the hash table index can be inserted into that slot. If all 64 slots are occupied, it is likely that one of the 64 occupants can be moved to an empty entry/slot without any further relocation. Note that every time contents are moved from one entry/slot to another in the hash tables, the corresponding hash table index 820 may be logged to record changes to the hash table. Advantageously, the 32-way set associativity may provide a load factor greater than 98%, so that values inserted into the hash table remain in the slots/entries and are not pushed out by the cuckoo hashing until the table is substantially full. By using the cuckoo hash, two possible entries for an extent key in the hash table can be directly computed and the 64 slots associated with the entries can be inspected, i.e., searched, to find the extent key. Illustratively, entries of the cuckoo hash table may be sized so that all 32 slots for the hash table index fit in a cache line of the CPU 210 enabling a fast linear search of the slots.

Hash Table Organization

Figure 8A:
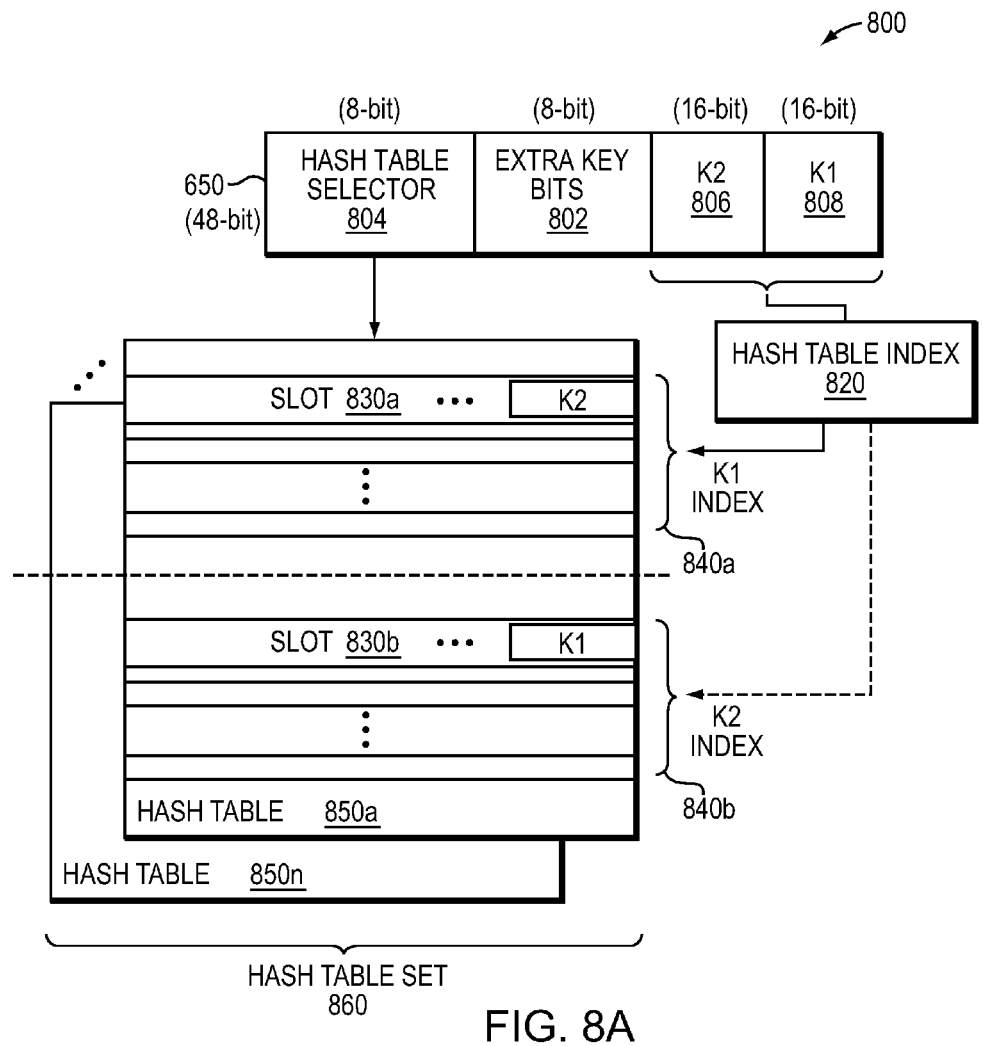
FIG. 8*a* is a block diagram of a hash table entry selection technique.

FIG. 8a is a block diagram of a cuckoo hash table that may be advantageously used with one or more embodiments described herein. In an embodiment, the extent metadata resides entirely in the memory 220 of each node 200 and is embodied as a hash table 850a-n of a set of hash tables 860 configured to address locations of the SSD. Note that the bucket mapping technique 700 ensures that the buckets assigned to the extent store instances are substantially evenly populated with extent metadata such that each bucket contributes equally to the hash tables served by an extent store instance, i.e., the bucket mapping technique 700 has an approximately uniform distribution. The extent store instance may use the hash value 650 to provide the extent metadata selection technique 800. To that end, the contents of the 48-bit (6 byte) hash value, i.e., the hash value 650, are illustratively organized into the following fields: an 8-bit field used as an index to select a hash table, i.e., one of 256 tables, from the set of hash tables ("hash table selector" 804), an 8-bit field ("extra key bits") 802, and two 16-bit fields used as indices to entries 840a-b (i.e., group of slots) in the selected hash table ("K2" 806 and "K1" 808). Each hash table 850 includes two halves where each half is addressable by one of the 16-bit indices (e.g., "K1" and "K2"), so that each table half may include 65536 (i.e., $2^{16}$) entries 840. Note, the hash table index 820 is determined from K1 and K2 depending on which half of the hash table is indexed. Further, each entry 840a-b is a 32-way associative set of slots 830 having the key-value pair. Accordingly, there are $2^{16} \times 32 \times 2$ (i.e., entries×associatively×2 table halves)=4 M (4,194,240) total entries/slots ("slots") per hash table and at least 256 tables, i.e., hash table selector 804, per extent store instance, yielding a billion (1,073,725,440 exactly) slots. Notably, the hash table set may be further expanded into subsets selected based on a function applied to the hash value 650 (e.g., computing a remainder of the hash value 650 for a prime number as an index to a subset of the hash table set 860), an exemplary embodiment of which is described in commonly owned U.S. patent application Ser. No. 14/044,624 titled Extent Hash Structure for Storage System by Kimmel et al., filed on Oct. 2, 2013.

Figure 8B:
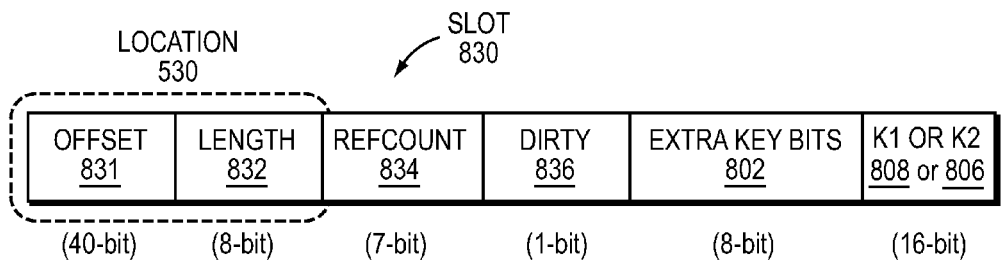
FIG. 8*b* is a block diagram of a hash table slot.

FIG. 8*b* is a block diagram of a hash table slot 830 that may be advantageously used with one or more embodiments described herein. Illustratively, the slot is organized as a 10-byte (80-bit) value having the following fields: a 5-byte (i.e., 40-bit) offset 831 indicating a location on SSD for an extent "keyed" by the slot; a 1-byte (8-bit) length 832 indicating a size of the extent; a reference count having at least 7-bits ("refcount" 834) indicating a number of metadata references to the extent; a dirty bit 836 indicating whether the slot has been changed, i.e., is "dirty"; the extra key bits 802 from the hash value 650 for the extent; and either "K1" 808 or "K2" 806 not used as the hash table index 820 to index to the entry 840. Note that the length field 832 may represent a number of sectors of a given size based on the geometry of the SSD 260, e.g., 512 bytes or 520 bytes, such that a 1-byte length may represent a range of 255×512 bytes=128K bytes. Accordingly, an extent may vary from 512 bytes to 128K bytes in 512 byte increments.

In an embodiment, combinations of sentinel values in one or more fields of the slot 830 may be used to indicate a type of extent, such as i) a "hole" or deleted extent and ii) a "put" or stored extent. For example, a refcount 834 of zero and offset 831 of zero may be used to indicate a deleted extent, whereas a refcount 834 greater than zero (i.e., one) and offset 831 other than zero may be used to indicate a stored extent. Compactness of the slot fields benefits efficient use of memory as it is desirable to maintain the hash tables in-core for fast lookup of key-value pairs, i.e., locations of extents from hash keys. For example, the previously calculated 1 billion slots may consume 10 GB in-core, i.e., 10-bytes per slot, not including any expansion (e.g., the expansion technique in an exemplary embodiment in aforementioned U.S. patent application Extent Hash Structure for Storage System multiplies the in-core consumption by 3). Notably, each extent store instance may support a LUN capacity of at least 4 terabytes (TB) based on a minimum 4 KB extent size (1 B×4 KB per extent) to a maximum of 384 TB based on a 128 KB extent size with hash table expansion (1 B×3 expansion×128 KB per extent).

Once a hash table 850*a* is selected, the extent store instance may extract either K1 or K2 of the hash value 650 for use as the hash table index 820 to index into the hash table (e.g., using K1 for the upper half of the table and K2 for the lower half of the table) and select an appropriate entry 840*a* configured to store, inter alia, a portion of the extent key 810, as well as an identification of location on SSD. Notably, K1 and K2 are distinguished from each other using an implied high-order bit that splits the cuckoo hash table into an upper address space and a lower address space. Illustratively, the implied high-order bit increases the address capability of K1 or K2 from $2^{16}$ possible locations to $2^{17}$ possible locations, where the upper address space of the hash table is addressable by one 16-bit field (e.g., K1) of the hash value and a lower address space of the hash table is addressable by the other 16-bit field (e.g., K2). In an embodiment, the selection of which hash table index (K1 or K2) to use to initially index into cuckoo hash table is arbitrary. In the case of an insertion of an entry (e.g., storing an extent) into the cuckoo hash table 850*a*, a desired approach may be to choose whichever upper or lower address space set is less occupied (after an exhaustive search of both sets 840*a* and 840*b*).

As noted, each cuckoo hash table has set-associative slots, e.g., 32 slots per associative set. In an embodiment, there is no ordering of the 32 slots within the associative set of an entry; a linear search may be performed to find an empty slot for inserting an extent key. Alternatively, the slots may be ordered to accommodate a faster search, e.g., binary search, especially for larger associative sets (e.g., 128 way), which may not fit into a CPU cache line. Similarly, once the associative set of slots is identified, i.e., as entry 840, that could hold the extent key, the linear search may be performed within the slots to determine whether the key is present. The advantage of the cuckoo hash table is that there are exactly 2 entries (each having 32 slots) in the entire cluster 100 at which a given extent key value can reside. Once the entry is indexed using K1 or K2 along with the implied high-order bit, there are 32 slots within the entry 840 to search.

In an embodiment, the number of slots per entry 840 is illustratively chosen as 32, because all 32 slots can fit into a cache line of, for example, an Intel processor (i.e., 32×size of the hash table index 820 in the slot). In other words, 16 bits or 2 bytes (K1 or K2) times the 32 slots equals 64 bytes, which is the size of an illustrative cache line. Once an operation fetches and manipulates a cache line, the cache line remains cached until it is evicted. For a linear search of the cached slots 830, no further fetch from memory may be required, thus avoiding any eviction of previously cached slots for the entry 840. Illustratively, the size of the set (i.e., 32 slots) is arbitrary and chosen so as to fit in the cache line. Without changing any of the algorithms for accessing a given set, i.e., entry 840, the set size could be changed to an arbitrary integer and even vary per set. The information constituting the remaining 8 bytes of an entry (including the offset 831 which constitutes part of the extent location 530 on SSD) may be stored out-of-line, i.e., not cached during the search of slots, in another portion of the hash table 850. It should be noted that the hash table 850 may be stored in column major order in memory (e.g., defining the hash table in the "C" programming language as a structure including the fields of the slot 830 as separate arrays). Thus, if it is desirable to access the K1 or K2 16-bit field, only one cache line access may be required.

To ensure fast and efficient performance, the hash table 850 may be further organized to require only one disk (SSD) access for every extent key obtained from the extent store instance. This is possible because the extent store layer 350 of the storage I/O stack 300 does not have the overhead of a directory hierarchy organization and, therefore, when an I/O request is forwarded to the extent store instance, a fast lookup in memory 220 may occur to the appropriate in-core hash table 850 and then the SSD(s) are accessed just once. Thus, there may be only one SSD access per I/O (read or write) operation, thereby improving read and/or write amplification.

Figure 9:
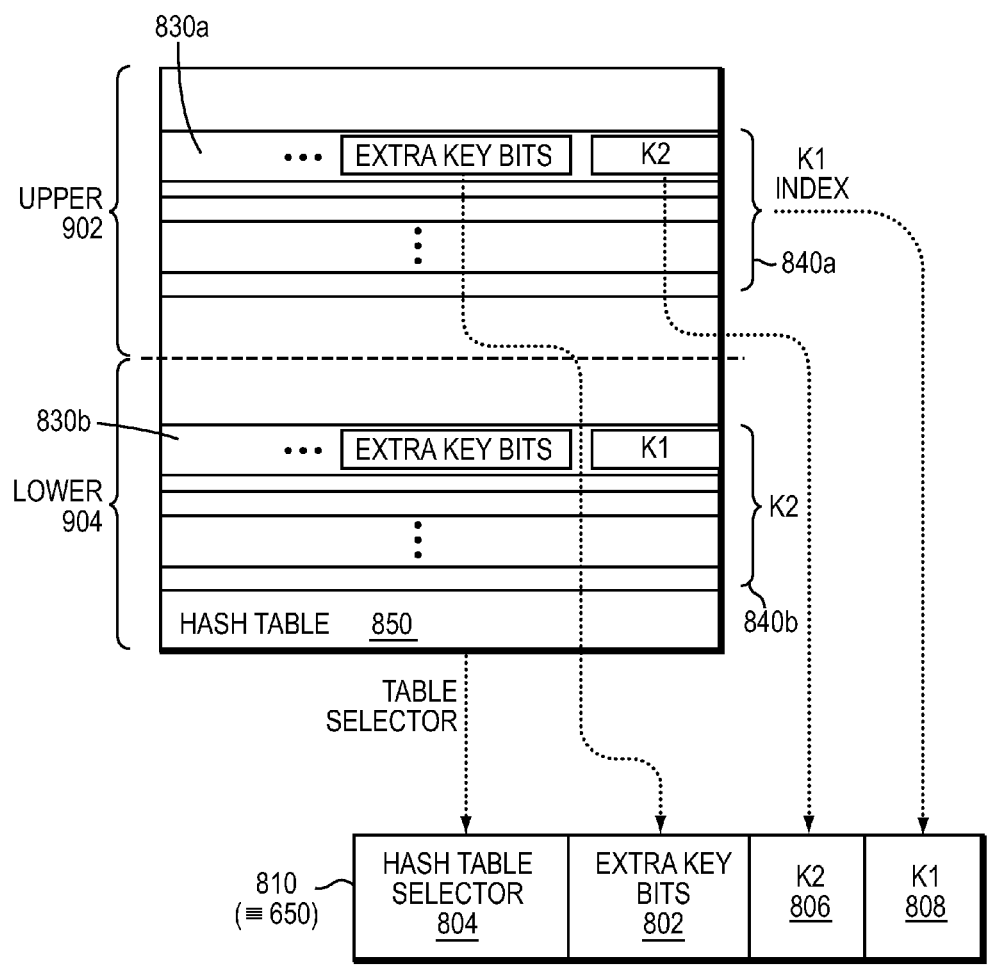
FIG. 9 is a block diagram of an extent key reconstruction technique.

FIG. 9 is a block diagram of an extent key reconstruction technique that may be advantageously used with one or more embodiments described herein. Extent key reconstruction aids efficient reassignment (i.e., migration) of a bucket (number) 725 (e.g., via the bucket mapping table 730) from a first extent store instance to a second extent store instance. For example, hash tables 850 of the first extent store instance may be searched for slots associated with the bucket to be reassigned, and those slots may then be re-inserted into the hash tables of the second extent store instance using extent keys reconstructed from each respective slot found from the search of the first extent store instance.

Illustratively, reconstruction of an extent key is based, in part, on the contents of a hash table slot 830a,b to thereby permit storage in the slot of only those bits of the hash value 650 required to identify, i.e., search, for the slot and reconstruct the hash value 650 (i.e., the substantially identical extent key 810). In an embodiment, the extent store layer 350 contains computer executable instructions executed by the CPU 210 to perform operations that implement the extent key reconstruction technique described herein. According to the technique, once the slot 830a,b is found, the 16-bit field (e.g. K1 or K2) can be discarded (is not stored) because the extent store layer (instance) can recreate the 16-bit field implicitly from the entry 840a,b in the upper address space portion 902 or lower address space portion 904 of the hash table 850. That is, use of bits from the hash value for a portion of the indexing enables inferential determination of the bits instead of having to store them. In addition, the 8 bits of hash table selector 804 do not need to be stored and can be recreated implicitly from the accessed hash table itself, i.e., determining a slot 830a,b implies having indexed into the appropriate hash table. Thus, only 2 bytes of the hash value 650 bits not implied by the index (i.e., K1 or K2) and 1 byte of extra key bits 802 need be stored in the slot 830a,b. Specifically, in order to reproduce the 6-byte (48-bit) hash value 650 (i.e., the extent key 810), 2 bytes of cuckoo indexing are inferred (not stored) by the entry in the table, 2 bytes of cuckoo indexing are stored in memory, one byte of the hash value is inferred (not stored) by the hash table selector of the hash table set, and finally one byte is stored in memory as extra bits. As a result, it is only necessary to store 3 bytes or 24 bits of hash value 650 (i.e., K1 or K2, plus the extra key bits 802) in the slot 830a,b of the hash table in order to reconstruct the hash value, i.e., the extent key 810. In an embodiment, the extra key bits 802 may be used to realize sufficient uniqueness in the event of a collision.

Hash Table Collision

Figure 10:
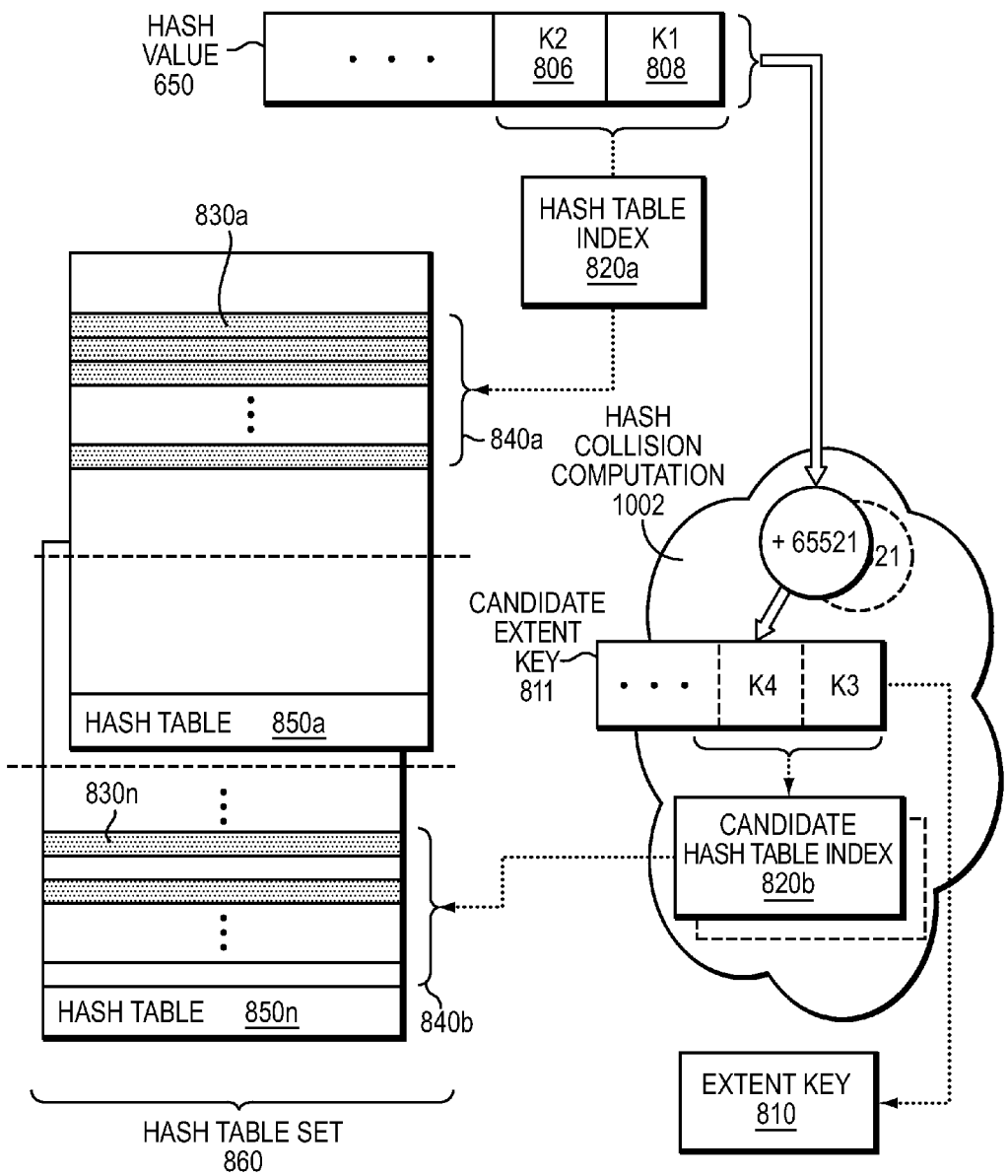
FIG. 10 is a block diagram of a hash collision technique.

FIG. 10 is a block diagram of a hash collision technique that may be advantageously used with one or more embodiments described herein. Illustratively, the hash collision technique employs a hash collision computation 1002 to determine a unique candidate extent key 811 (having a candidate hash table index 820b) in the event of a collision, i.e., the hash table index 820a collides with a slot 830a matching the combination of the extra key bits 802 and either K1 or K2, whichever is found in that field of the slot. As used herein, a collision arises when an entry is properly indexed by the hash table index 820a of the 48-bit hash value 650 into the hash table 850a, but a comparison reveals that a different extent already has allocated the candidate extent key, i.e., the slot 830a is occupied by a different extent with extra key bits 802 matching those of the candidate extent key. It should be noted that proper indexing into the hash table involves indexing into both the upper address space portion 902 and the lower address space portion 904 of the hash table 850 (using, e.g., K1 and K2 respectively), as an extent using the candidate extent key may already reside in either portion. Illustratively, the collision occurs as a result of a failed de-duplication opportunity and the need to choose a new entry indexed by a new hash table index (i.e., the candidate hash table index 820b), which is determined from a new hash value (i.e., the candidate extent key 811). That is, the hash value 650 is insufficient and the candidate hash table index 820b may be generated. The new entry 840b (and new slot 830n) in the hash table set 860 may be determined from the candidate extent key 811 computed from the hash value 650 such that the candidate extent key 811 resolves to a same (i.e., single) bucket number as that for the hash value 650. That is, both the candidate extent key 811 and the hash value 650 resolve to the same bucket number, while also resolving to different entries 840a,b in the hash table set 860. Note, resolving to a same bucket number also resolves to the same extent store instance (i.e., via bucket mapping table using the bucket number).

In an embodiment, the candidate extent key 811 may be computed from the hash value 650 using the deterministic algorithm, i.e., the hash collision computation 1002, which illustratively adds the large prime, e.g., 66521, to the hash value, thereby resolving to the same bucket. Alternatively, a sub-string (i.e., sub-set of bits) of the hash value 650 may be used to compute the candidate extent key 811. In an embodiment, the sub-string may be formed from low-order bits of the hash value 650. Further, the sub-string may be selected so that a sufficiently large number of alternate entries may be computed using the hash collision technique. Illustratively, the extent store layer 350 contains computer executable instructions executed by the CPU 210 to perform operations that implement the hash collision technique described herein.

In an embodiment, the extent key 810 may be substantially identical to the 48-bit hash value 650, except in a situation where the large prime number is added to the hash value to resolve a de-duplication collision. In that situation, the 48-bit hash value may be altered to generate the candidate extent key 811 and hash table index 820b. As noted, the hash table index is the mechanism for accessing an entry 840 of the hash table to retrieve the extent key. Thereafter, the retrieved extent key 810 is needed to determine a location on SSD for the extent, i.e., retrieve a slot in the hash table set having the location for the extent.

Illustratively, a collision is different from searching for a slot into which to insert information into the hash table, i.e., a fill of a cuckoo hash table entry. If it is determined that all 64 slots in the 2 entry associative sets of the cuckoo hash table are full without any extent key match, space can be freed in one of the 2 associative sets by a cuckoo eviction process. In an embodiment, the cuckoo eviction process may relocate the content of any one of the 64 slots of the associative sets to an alternative entry in the cuckoo hash table using the alternate hash table index of the entry, i.e., the entry's K1 or K2, as the index into either the upper or lower half of the table.

In the event of a collision, a typical solution may be to randomly choose a new hash value (i.e., candidate extent key 811). However, it may be desirable to ensure that de-duplication may be invoked when distributing or re-distributing buckets throughout the cluster. When a collision is resolved the candidate extent key 811 should be within the same bucket; otherwise a resulting extent key may resolve to a different extent store instance having different hash tables. That is, the candidate extent key 811 should resolve to the same bucket number 725, i.e., to the same extent store instance, based on the bucket mapping table 730. Accordingly, the hash collision computation 1002 may add the prime number associated with the number of buckets to the hash value (or a sub-string of the hash value) to obtain the candidate hash table index 820b, so that the remainder computation 710 used to determine the bucket number 725 yields the same bucket. It will be understood by persons of skill in the art that suitable carry overflow handling (i.e., resolution to the same bucket number) may be necessary when the hash collision technique operates on the sub-string of the hash value or the hash value. For example, merely choosing a hash collision computation such as K1+1 may work until the point at which the cluster grows and all extent keys (indexes) and buckets are redistributed. At that point, there is no guarantee that K1+1 will correctly index into the particular bucket (or even the particular extent store instance) associated with the hash table.

As noted, the bucket-to-extent store instance mapping involves dividing the hash value by a large prime number (65521) to arrive at a bucket number 725. In an embodiment, the deterministic algorithm (i.e., the hash collision computation 1002) may add the large prime number (65521) to a sub-string of the hash value, e.g., the hash table index 820a (in the event of a collision) to create new indices K3 and K4, i.e., the candidate hash table index 820b. In an alternative embodiment, the collision technique may operate on the lower 40-bits of the hash value (i.e., sub-string) so that the candidate hash table index references the same hash table (i.e., the hash table selector 804 field is frozen). Should a collision occur again, i.e., a collision of the candidate hash table index 820b, the process may be continued by adding the large prime number until a unique candidate extent key 811 is found for the extent, thus ensuring the candidate hash table index 820b will reference (fall into) the same bucket (and thus the same node) whether the cluster grows or shrinks. Although the deterministic algorithm ensures that the candidate extent key 811 will resolve to the same bucket and same node 200 of the cluster, when hash table expansion is used (such as disclosed in an exemplary embodiment in the aforementioned U.S. patent application Extent Hash Structure for Storage System), the addition of the large prime may not resolve to the same hash table 850a within the same extent store instance of the cluster.

Advantageously, the file system metadata arrangement embodied as the cuckoo hash table described herein may be optimized for high performance and may be compactly organized to enable extent metadata describing a large LUN to reside in memory. That is, the file system metadata arrangement may be optimized such that hash values may be quickly directed to the appropriate cuckoo hash table and efficiently stored/retrieved in/from a hash table entry/slot having a high degree of table load. In addition, the file system metadata arrangement may be organized to reduce the amount of metadata stored in each entry/slot of the cuckoo hash table, yet still enable reconstruction of a hash value/extent key, in accordance with the extent key reconstruction technique, to aid migration of buckets between extent store instances. Moreover, hash collisions may be resolved within the same set of cuckoo hash tables using the hash collision computation that resolves to the same set of tables, thus assuring that collisions involving a given deterministic set of candidate extent keys resolve within the same extent store instance regardless of any redistribution of buckets among extent store instances within the cluster.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving a write request having an extent, the write request processed at a storage system having a processor and a memory, the storage system coupled to a solid state drive (SSD);
    applying a hash function to the extent to generate a hash value, the hash value including a hash table selector, a first hash table index, and a second hash table index;
    selecting a hash table from a set of hash tables using the hash table selector, each hash table divided into a plurality of index address spaces;
    selecting a first entry in an upper index address space of the hash table using the first hash table index as a first index, the first entry including a first set of slots, each slot of the first set of slots including a first key and a first location field;
    searching each of the first keys of the first set of slots using the second hash table index;
    determining whether a first free slot exists within the first set of slots; and
    in response to determining that the first free slot exists, storing an SSD offset in the first location field of the first free slot, storing the second hash table index as the first key of the first free slot, and storing the extent on the SSD at the SSD offset.

2. The method of claim 1 further comprising:
    selecting a second entry in a lower index address space of the hash table using the second hash table index as a second index, the second entry including a second set of slots, each slot of the second set of slots including a second key and a second location field;
    searching each of the second keys of the second set of slots using the first hash table index;
    determining whether a second free slot exists within the second set of slots; and
    in response to determining that the second free slot exists, storing the SSD offset in the second location field, storing the first hash table index as the second key of the second free slot, and storing the extent on the SSD at the SSD offset.

3. The method of claim 2 wherein a first number of slots in the first set of slots is different than a second number of slots in the second set of slots.

4. The method of claim 1 wherein the hash value further includes extra key bits and wherein each slot of the first set of slots further includes the extra key bits.

5. The method of claim 1 wherein each of the first keys of the first set of slots is cached within one or more cache lines of the processor of the storage system.

6. The method of claim 1 wherein each slot of the first set of slots further includes a length indicating a number of sectors on the SSD.

7. The method of claim 1 wherein a total number of slots of each set of slots of each entry in each table of the set of hash tables is greater than $2^{21}$ and wherein the set of hash tables is resident in the memory.

8. The method of claim 1 wherein each slot of the first set of slots further includes a reference count indicating a number of references to the extent.

9. The method of claim 1 further comprising:
    matching one of the first keys of the first set of slots to the second hash table index;
    generating a first candidate hash table index;
    selecting a second entry in the upper index address space of the hash table using the second hash table index as a second index, the second entry including a second set of slots, each slot of the second set of slots including a second key and a second location field of data on the SSD;

searching each of the second keys of the second set of slots using the first hash table index;

determining whether a second free slot exists within the second set of slots; and in response to determining that a second free slot exists, storing the SSD offset in the second location field, storing the first hash table index as the second key of the second free slot, storing the extent on the SSD at the SSD offset.

10. A method comprising:

receiving a write request having an extent, the write request processed at a storage system having a processor and a memory, the storage system coupled to a solid state drive (SSD);

applying a hash function to the extent to generate a hash value, the hash value including a hash table selector and first hash table indices (K1, K2);

dividing a hash space of the hash value into a number of buckets representative of the extents;

selecting a first hash table from a set of hash tables using the hash table selector;

indexing into the first hash table using the K1 hash table index of the first hash table indices to select a first entry from the first hash table, the first entry including a first set of slots, each slot of the first set of slots including a first key;

matching each of the first keys of the first set of slots to the K2 hash table index of the first hash table indices;

adding the number of buckets representative of the extents to a portion of the hash value to generate a candidate extent key including second hash table indices (K3, K4);

indexing into a second hash table using the K3 hash table index to select a second entry, the second entry including a second set of slots, each slot of the second set of slots including a second key and a location field;

searching each of the second keys of the second set of slots using the K4 hash table index;

determining whether a second free slot exists within the second set of slots; and in response to determining that the second free slot exists, storing an SSD offset in the location field of the second free slot, storing the K4 hash table index as the second key of the second free slot, and storing the extent on the SSD at the SSD offset.

11. A system comprising:

a storage system having a memory connected to a processor via a bus;

a storage array coupled to the storage system and having one or more solid state drives (SSDs);

a storage I/O stack executing on the processor of the storage system, the storage I/O stack when executed operable to:

receive a write request having an extent;

apply a hash function to the extent to generate a hash value, the hash value including a hash table selector, a first hash table index, and a second hash table index;

select a cuckoo hash table from a set of cuckoo hash tables using the hash table selector, each of the set of cuckoo hash tables divided into a plurality of address spaces;

select a first entry in a first address space of the cuckoo hash table using the first hash table index, the first entry including a first set of slots, each slot of the first set of slots including a first key and a first location field;

search each of the first keys of the first set of slots using the second hash table index;

determine whether a first free slot exists within the first set of slots; and in response to determining that the first free slot exists, store an SSD offset in the first location field of the first free slot, store the second hash table index as the first key of the first free slot, and store the extent on the one or more SSDs at the SSD offset.

12. The system of claim 11 wherein the storage I/O stack is further configured to:

select a second entry in a second address space of the cuckoo hash table using the second hash table index, the second entry including a second set of slots, each slot of the second set of slots including a second key and a second location field;

searching each of the second keys of the second set of slots using the first hash table index;

determining whether a second free slot exists within the second set of slots; and in response to determining that the second free slot exists, storing the SSD offset in the second location field of the second free slot, storing the first hash table index as the second key of the second free slot, storing the extent on the one or more SSDs at the SSD offset.

13. The system of claim 11 wherein the hash value further includes extra key-bits and wherein each slot of the first set of slots further includes the extra key-bits.

14. The system of claim 13 wherein each of the first keys of the first set of slots is cached within one or more cache lines of the processor of the storage system.

15. The system of claim 11 wherein each slot of the first set of slots further includes a length indicating a number of sectors on the one or more SSDs.

16. The system of claim 11 wherein a total number of slots of each set of slots of each entry in each table of the set of hash tables is greater than $2^{21}$ and wherein the set of hash tables is resident in the memory.

17. The system of claim 11 wherein each slot of the first set of slots further includes a reference count indicating a number of references to the extent.

18. The system of claim 11 wherein the storage I/O stack is further configured to:

match the first key of the free slot to the second hash table index; and store a sentinel value in the first location field of the free slot, thereby indicating that the extent is deleted.

19. The system of claim 18 wherein the sentinel value is zero.

20. The system of claim 11 wherein the storage I/O stack is further configured to:

reconstruct the hash value using the first key of the free slot.

* * * * *